US009675980B2

(12) United States Patent
Filippov

(10) Patent No.: US 9,675,980 B2
(45) Date of Patent: Jun. 13, 2017

(54) FLOTATION PROCESS FOR RECOVERING FELDSPAR FROM A FELDSPAR ORE

(75) Inventor: Lev O. Filippov, Nancy (FR)

(73) Assignees: Imerys Ceramics France, Paris (FR); Universite de Lorraine, Nancy (FR); Center National de la Recherche Scientific (C.N.R.S.), Paris (FR)

( * ) Notice: Subject to any disclaimer, the term of this patent is extended or adjusted under 35 U.S.C. 154(b) by 659 days.

(21) Appl. No.: 13/520,854

(22) PCT Filed: Jan. 6, 2011

(86) PCT No.: PCT/EP2011/050133
§ 371 (c)(1),
(2), (4) Date: Nov. 7, 2012

(87) PCT Pub. No.: WO2011/083136
PCT Pub. Date: Jul. 14, 2011

(65) Prior Publication Data
US 2013/0068666 A1 Mar. 21, 2013

(30) Foreign Application Priority Data
Jan. 8, 2010 (EP) .................................... 10290006

(51) Int. Cl.
B01D 21/01 (2006.01)
C02F 1/24 (2006.01)
(Continued)

(52) U.S. Cl.
CPC .......... *B03D 1/01* (2013.01); *B01D 21/0084* (2013.01); *B03D 1/008* (2013.01); *B03D 1/016* (2013.01);
(Continued)

(58) Field of Classification Search
CPC .... B01D 15/00; B01D 21/0084; B01D 21/01; B03D 1/004; B03D 1/008; B03D 1/01;
(Continued)

(56) References Cited

U.S. PATENT DOCUMENTS 2,578,790 A * 12/1951 Duke ............................ 209/166
2,665,004 A * 1/1954 Zukosky .......................... 209/10
(Continued)

FOREIGN PATENT DOCUMENTS

WO WO 00/00443 A2 1/2000
WO WO 2011/083136 A1 7/2011

OTHER PUBLICATIONS

Vidyadhar, A.; Rao, K. Hanumantha; and Forssberg, K.S.E., "Adsorption of N-Tallow 1,3-Propanediamine-Dioleate Collector on Albite and Quartz Minerals, and Selective Flotation of Albite from Greek Stefania Feldspar Ore", Journal of Colloid and Interface Science, vol. 248, 2002, pp. 19-29.
(Continued)

Primary Examiner — Joseph Drodge
(74) Attorney, Agent, or Firm — Finnegan, Henderson, Farabow, Garrett & Dunner LLP

(57) ABSTRACT

A flotation process for recovering feldspar from a feldspar containing feed material is disclosed. The process includes forming an aqueous suspension of a feldspar containing feed material, in the absence of hydrofluoric acid, wherein the suspension includes from 0.004 to 0.3% wt. of a flotation reagent including: (a) one or more amines, containing at least one aliphatic hydrocarbon chain, linear or branched, saturated or unsaturated, including 8 to 50 carbon atoms, or a salt thereof; and (b) one or more primary, secondary or tertiary alcohols, containing at least one aliphatic hydrocarbon chain, linear or branched, saturated or unsaturated, including 8 to 50 carbon atoms; the ratio of (a) to (b) ranging
(Continued)

from 500:1 to 1:40 by weight. The process further includes agitating the obtained suspension to produce a feldspar containing fraction, and separating the feldspar containing fraction.

23 Claims, 2 Drawing Sheets

(51) Int. Cl.
| | | |
|---|---|---|
| *C02F 1/54* | (2006.01) | |
| *B03D 1/01* | (2006.01) | |
| *B03D 1/02* | (2006.01) | |
| *B01D 21/00* | (2006.01) | |
| *C02F 1/56* | (2006.01) | |
| *B03D 1/016* | (2006.01) | |
| *B03D 1/008* | (2006.01) | |

(52) U.S. Cl.
CPC ............... *C02F 1/24* (2013.01); *C02F 1/56* (2013.01); *B03D 2201/02* (2013.01); *B03D 2203/04* (2013.01)

(58) Field of Classification Search
CPC .......... B03D 1/016; B03D 1/02; B03D 1/023; B03D 1/025; B03D 2201/002; B03D 2201/005; B03D 2201/007; B03D 2201/0204; B03D 2201/06; B03D 2203/02; B03D 2203/04; C01B 33/26; C02F 1/24; C02F 1/54; C02F 1/56; C02F 1/66; C02F 2103/16
USPC ......... 209/164–167; 210/702–705, 709, 724, 210/738; 423/118.1, 327.1, 328.1
See application file for complete search history.

(56) References Cited

U.S. PATENT DOCUMENTS

| | | | | |
|---|---|---|---|---|
| 2,937,751 | A | * | 5/1960 | Schoeld ............... B03D 1/01 209/166 |
| 3,822,014 | A | * | 7/1974 | Verheyden et al. .......... 209/166 |
| 3,844,939 | A | | 10/1974 | Katayanagi |
| 4,038,179 | A | | 7/1977 | Katayanagi |
| 4,279,742 | A | * | 7/1981 | Ivanov et al. ............... 209/166 |
| 4,337,149 | A | * | 6/1982 | Escalera ............... B03D 1/008 209/166 |
| 4,565,647 | A | * | 1/1986 | Llenado ............... A61K 8/466 209/166 |
| 4,714,544 | A | * | 12/1987 | von Rybinski et al. ...... 209/167 |
| 4,744,892 | A | * | 5/1988 | von Rybinski et al. ...... 209/167 |
| 4,789,466 | A | * | 12/1988 | von Rybinski et al. ...... 209/166 |
| 5,808,158 | A | * | 9/1998 | Conrads ............... C07C 209/16 564/478 |
| 2006/0073080 | A1 | * | 4/2006 | Tonkovich ............ B01F 3/0446 516/18 |
| 2008/0029460 | A1 | * | 2/2008 | Wright ................... B03D 1/01 210/705 |
| 2010/0000913 | A1 | * | 1/2010 | Hurd .................... B03D 1/008 209/166 |
| 2010/0078364 | A1 | * | 4/2010 | Bigorra Llosas ........ B03D 1/01 209/167 |

OTHER PUBLICATIONS

Vidyadhar, A.; Rao, K. Hanumantha; and Forssberg, K.S.E., Adsorption Mechanism of Mixed Cationic/Anionic Collectors in Feldspar-Quartz Flotation System, Doctoral Thesis, 71 pages.
Vidyadhar, Ari, "Flotation of Silicate Minerals: Physico-chemical Studies in the Presence of Alkylamines and Mixed (Cationic/Anionic/Non-ionic) Collectors", Doctoral Thesis, 2001, XP002588672, pp. 12-16.
International Search Report and Written Opinion dated May 17, 2011, for International Application No. PCT/EP2011/050133, filed Jan. 6, 2011.

* cited by examiner

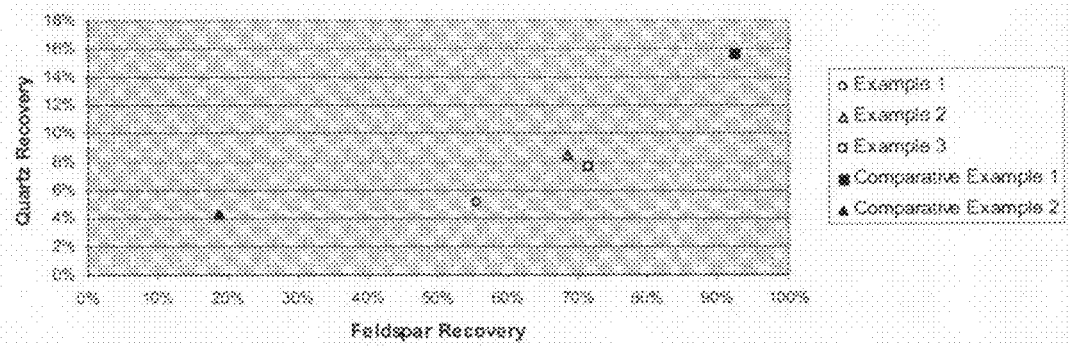
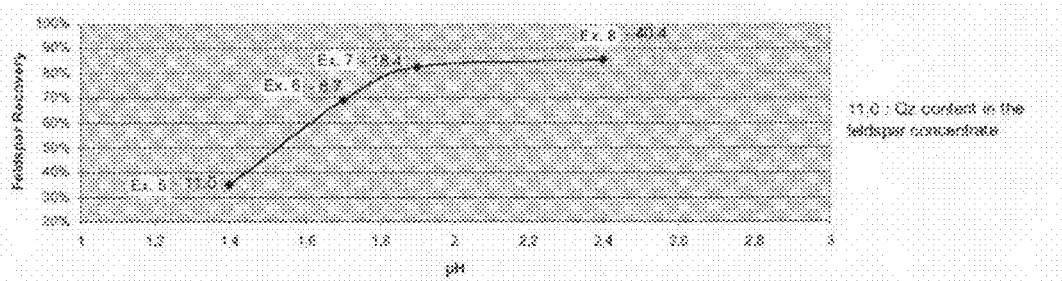
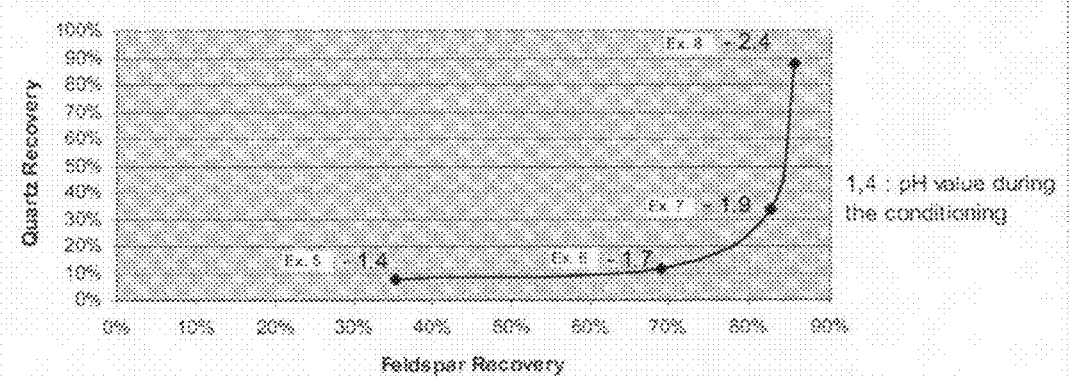

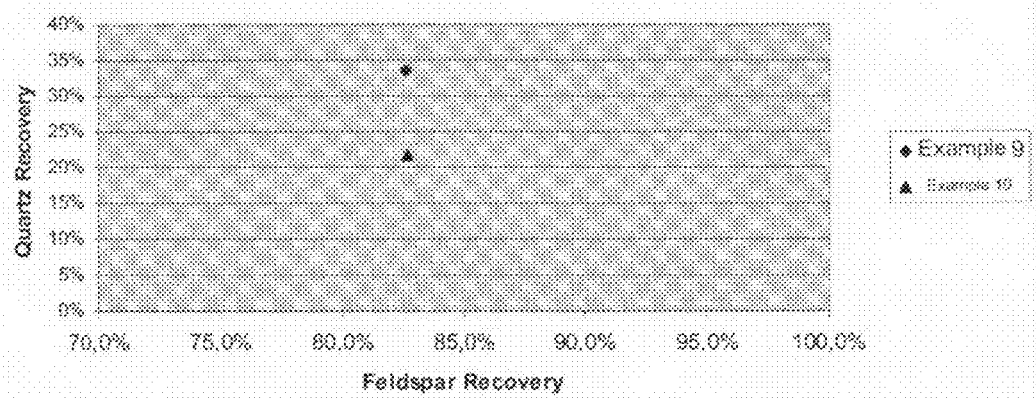
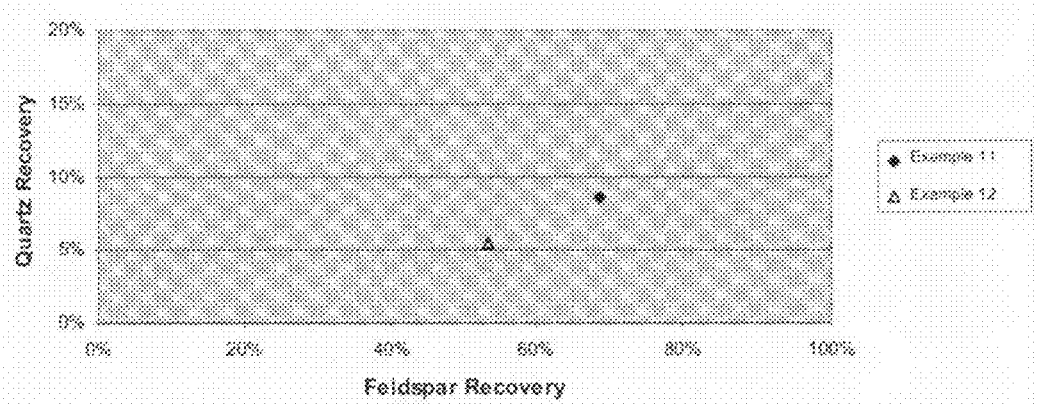
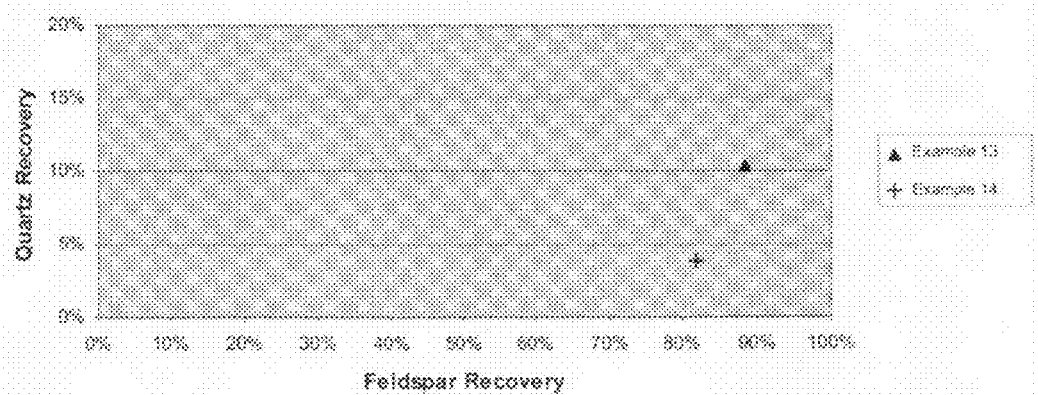

FLOTATION PROCESS FOR RECOVERING FELDSPAR FROM A FELDSPAR ORE

This application is a U.S. national stage entry under 35 U.S.C. §371 from PCT International Application No. PCT/EP2011/050133, filed Jan. 6, 2011, and claims priority to and the benefit of the filing date of EP Application No. 10290006.5, filed Jan. 8, 2010, the subject matter of both of which is incorporated herein by reference.

FIELD OF THE INVENTION

The present invention concerns an improved flotation process for separating feldspar from quartz within a feldspar ore, wherein a specific combination of flotation reagents is used under acidic conditions, in the absence of hydrofluoric acid.

BACKGROUND OF THE INVENTION

Flotation processes are widely used in the art to concentrate and separate ore constituents present in naturally-occurring deposits, such as feldspar. A conventional flotation process comprises the steps of crushing and grinding the ore material to reach a suitable degree of liberation, conditioning the ground material under high acidic conditions with a promoter, such as hydrofluoric acid or sodium fluoride, to provide an aqueous suspension having pH of about 2-3, and floating the material to form a feldspar-containing concentrate and a waste product, commonly referred to as "tailings".

The aqueous suspension is normally conditioned by treating with a so-called "collector", normally a cationic amine-type surfactant. A foaming agent may be further added. Flotation is carried out by bubbling air or nitrogen through the suspension. Feldspars are then recovered in the froth or foam thus generated, while the other constituents, such as quartz, remain in the tailings.

Hydrofluoric acid (HF) is traditionally used in plant for conditioning feldspars because it acts as a pH regulator and an activating agent. As a result, HF provides the process with excellent selectivity. However, the toxicity of HF and its ecological impacts from the potential fluoride ion contamination of both surface and subsurface water sources are relevant limiting factors for the use of HF in industrial scale processes. In fact, HF requires careful handling procedures and additional steps are needed for disposing of the water used during flotation, thus significantly increasing process costs. Moreover, HF has the disadvantage of creating a corrosive chemical environment in the flotation cells and processing equipment. Therefore, the interest for new processes free from HF is always growing.

Various processes to separate feldspar from quartz have been developed in the art to try to limit or avoid the use of HF; in particular, various non-fluoride reagent systems, comprising mixtures of cationic and anionic collectors, have been proposed in the art. U.S. Pat. No. 3,844,939 describes a froth flotation process wherein hydrofluoric acid is substituted by sulfuric acid as the activating agent, and the collector system comprises a combination of a higher aliphatic amine salt (such as tallow diamine acetate) and a higher aliphatic or aromatic sulfonate; the pH of the flotation pulp is adjusted to 2-3.5. Besides the high reagent cost, this process has the disadvantage of providing an unsatisfactory recovery of feldspar from high feldspar containing ores. Moreover, if the pH is not carefully controlled, sulfuric acid reacts with the higher aliphatic amine to form a precipitate, thus providing feldspar of unsatisfactory quality and requiring additional flotation steps.

An alternative approach is disclosed in U.S. Pat. No. 4,038,179, wherein hydrochloric acid is used instead of sulfuric acid, and the collector system comprises a mixture of petroleum sulfonate and N-higher alkyl-alkylenediamine salt.

A. Vidyadhar et al., *Journal of Colloid and Interface Science* 248, 19-29 (2002), disclose the use of a mixed collector system comprising a cationic alkyl diamine and oleate, at pH of 2. This system shows very low feldspar recovery levels (less than 60% albite recovery, as indicated in FIG. 17, page 28) and low feldspar selectivity. Therefore, when compared to conventional HF flotation processes, the above solutions are still unsatisfactory; it is thus felt the need for a flotation process which does not require the use of hazardous chemicals such as HF, and which at the same time is able to provide improved recovery levels of feldspar, with high selectivity towards feldspar.

SUMMARY OF THE INVENTION

The Applicant has surprisingly found that feldspar may be recovered in high yields and high selectivity by using a collector system comprising a mixed cationic/non-ionic surfactant, including one or more higher aliphatic amines and one or more higher alcohols. In one aspect, the present invention provides a HF-free flotation process for recovering feldspar from a feldspar containing feed material, comprising the following steps:

(1) forming an aqueous suspension of a feldspar containing feed material, in the absence of hydrofluoric acid, wherein the suspension comprises from about 0.004 to about 0.3% wt. of a flotation reagent comprising:

(a) one or more amines, containing at least one aliphatic hydrocarbon chain, linear or branched, saturated or unsaturated, comprising 8 to 50 carbon atoms, or a salt thereof; and (b) one or more primary, secondary or tertiary alcohols, containing at least one aliphatic hydrocarbon chain, linear or branched, saturated or unsaturated, comprising 8 to 50 carbon atoms;

the ratio of (a) to (b) ranging from 500:1 to 1:40 by weight;

(2) agitating the obtained suspension to produce a feldspar containing fraction, and (3) separating the feldspar containing fraction.

According to a preferred embodiment, in step (1) the pH of the aqueous suspension ranges from 1.3 to 3.0, and the acid consumption preferably ranges from 0.1 to 1.5 kg/ton of feed material. Moreover, in step (1) the feldspar containing feed material has preferably a solids concentration preferably ranging from 20 to 75% wt.

BRIEF DESCRIPTION OF THE DRAWINGS

FIG. 1 is a plot showing flotation results for three exemplary suspensions and two comparative examples, consistent with this disclosure.

FIG. 2 is a plot showing flotation results for four exemplary suspensions of varying pH, consistent with this disclosure.

FIG. 3 is a plot showing flotation results for four exemplary suspensions, consistent with this disclosure.

FIG. 4 is a plot showing flotation results for two exemplary suspensions, consistent with this disclosure.

FIG. 5 is a plot showing flotation results for two exemplary suspensions, consistent with this disclosure.

FIG. 6 is a plot showing flotation results for two exemplary suspensions, consistent with this disclosure.

DETAILED DESCRIPTION OF THE INVENTION

The use of the flotation reagent comprising components (a) and (b) in the process of the invention offers the advantage of environmental and operational safety, avoiding the use of HF, at the same time providing good recovery levels of feldspar and high selectivity towards feldspar.

Amine component (a) is a higher aliphatic amine or a salt thereof, commonly used in the art as collector in conventional flotation processes; more specifically, amine (a) is an amine, preferably primary, secondary or tertiary, containing at least one aliphatic hydrocarbon chain, linear or branched, saturated or unsaturated, containing 8 to 50 carbon atoms, preferably 10 to 30, and even more preferably 15 to 25 carbon atoms, or a salt thereof with an organic or inorganic acid.

According to a preferred embodiment, the amine (a) has formula (I):

wherein $R^1$ is an alkyl group, linear or branched, saturated or unsaturated, containing 8 to 50 carbon atoms, preferably 10 to 30, and more preferably 12 to 25 carbon atoms, and $R^2$ and $R^3$ are independently selected from H and alkyl group, linear or branched, saturated or unsaturated, containing 1 to 5 carbon atoms, preferably 1 to 3 carbon atoms.

The amount of amine (a) in the aqueous suspension preferably ranges from 0.003 to 0.15% wt., more preferably from 0.01 to 0.05% wt.; the consumption of amine (a) preferably ranges from 0.05 to 2 kg/ton of feed material, and more preferably from 0.2 to 0.7 kg/ton.

Examples of suitable amine or salts thereof include higher alkyl or alkenylamines such as dodecylamine, pentadecylamine, hexadecylamine, octadecylamine and octadecenylamine; primary amines such as mixed amines, for example, coconut oil amines, tallow amines and soybean oil amines; secondary amines such as N-dodecylpropylenediamine, N-pentadecylethylenediamine, decylhexamethylenediamine and tallow propylenediamine; and tertiary amines such as condensate of stearic acid with N-oleyl-N',N'-diethylethylenediamine or triethanolamine and N-acylates of alkylenetriamines, with inorganic acids such as hydrochloric acid and phosphoric acid, or with organic acids such as acetic acid, propionic acid, tertaric acid and succinic acid.

The alcohol component (b) can be a primary, secondary or tertiary alcohol, and preferably is a primary alcohol. According to a preferred embodiment, the alcohol component (b) contains at least one aliphatic hydrocarbon chain, linear or branched, saturated or unsaturated, comprising 8 to 50 carbon atoms, preferably 10 to 25, and more preferably 12 to 18 carbon atoms. According to another preferred embodiment, the alcohol component (b) includes one or more isoacohols, preferably having a $C_{10}$-$C_{25}$ branched hydrocarbon chain; the alcohol component (b) can also include a mixture of isoalcohols having different hydrocarbon chain structure and/or chain length. According to another preferred embodiment, the alcohol component (b) includes one or more $C_{12}$-$C_{32}$ 2-alkyl-1-alkanols, also known in the art as Guerbet alcohols.

The amount of alcohol (b) in the aqueous suspension preferably ranges from 0.0005 to 0.15% wt., more preferably from 0.001 to 0.07% wt.; the consumption of alcohol (b) preferably ranges from 0.01 to 2 kg/ton of feed material, more preferably from 0.02 to 1 kg/ton of feed material.

The ratio of the amine (a) to the alcohol (b) preferably ranges from 500:1 to 40, more preferably from 200:1 to 1:20 by weight, and even more preferably from 35:1 to 1:5 by weight. For example, the ratio of amine (a) to the alcohol (b) may range from 5:1 to 1:1, or may range from 3:1 to 1:1, or may range from 2:1 to 1:1.

In the suspension of step (1), the flotation reagent containing components (a) and (b) is comprised in an amount ranging from about 0.004 to about 0.3% wt., more preferably from about 0.05% to about 0.2% wt.

The feed material has preferably an average particle size ranging from 1 to 800 microns, and more preferably from 50 to 400 microns. The feldspar containing feed material may be obtained from a feldspar ore, suitably ground to obtain a fraction having an average particle size preferably lower than 1 mm; the ground fraction may be washed with water to effect desliming. Therefore, the flotation process of the present invention may further comprise, before step (1), a step of grinding the starting material to give a feed material having an average particle size lower than 1 mm, and optionally a step of desliming the pulverized feed material. By "feldspar" is meant herein minerals such as plagioclases, orthoclases, petalites, hyalophanes, and other similar materials occurring in granites, diorites, granodiorites, pegmatites, leptynites, albitites, feldspathic sand and other similar materials. Preferred materials include plagioclase and orthoclase.

In step (1) of the process of the invention, the solids concentration of the feldspar containing feed material in the aqueous suspension preferably ranges from 20 to 75% wt., and more preferably from 60 to 70% wt. The pH of the aqueous suspension may be controlled by the addition of an acid selected from the group consisting of sulfuric acid and hydrochloric acid and mixtures thereof, and preferably sulfuric acid. The aqueous suspension has a pH preferably ranging from 1.3 to 3.0, and more preferably from 1.6 to 1.9. The acid consumption preferably ranges from 0.1 to 1.5 kg/ton of feed material, and more preferably from 0.3 to 1.0 kg/ton.

In step (1) of the process of the invention, components (a) and (b) may be added to the aqueous suspension simultaneously, independently or in combination, or in any order.

In step (2) of the process of the invention, flotation is carried out according to conventional methods known in the art. The aqueous suspension obtained from step (1) is preferably introduced in a flotation cell; the suspension is further diluted to a concentration of the feldspar containing feed material preferably ranging from 5 to 50% wt, and more preferably from 25 to 30% wt. The pH of the suspension is preferably maintained in the range of 1.6 to 5.5, more preferably from 2.5 to 4.0, and even more preferably around 3.00.

Flotation is preferably carried out by bubbling air or nitrogen through the suspension; during flotation, the feldspar-containing fraction will be located in the froth region of the flotation cell, while the quartz-containing tailings fraction will be located in the bottom region of the flotation cell.

A foaming agent may be optionally added to the aqueous suspension; suitable foaming agents are the ones known in the art for froth flotation, such as for example vegetable essential oils and cresolic acids. An impeller may be rotated to effect sufficient foaming and the resulting froth is separated from the tailings. Thus, a feldspar-containing fraction and a quartz-containing fraction are obtained as froth and tailings, respectively.

In step (3) of the process of the invention, a feldspar containing fraction is separated, according to conventional methods known in the art. The feldspar containing fraction, normally the froth, can be dried and processed according to conventional treatments.

The process of the present invention offers the advantage of safe environment and operations, since the use of HF is avoided, at the same time providing satisfactory levels of feldspar recovery, with a very high selectivity towards feldspar.

The process of the present invention will be illustrated by the following examples, which are not intended to limit the scope of the present invention. Unless otherwise stated, all parts and percentages are by weight.

The properties reported in the detailed description and in the examples have been measured according to the methods reported in the following.

Before the flotation tests, the chemical composition of each mineral species was investigated using an electronic microprobe (at least 30 punctual analyses for each mineral). Then these data were used with the chemical analysis done after each flotation test in order to convert from assays to mineral composition. In order to make this conversion, it was assumed that the whole % $Na_2O$ is due to albite minerals, the whole % $K_2O$ is due to microcline minerals, and only albite, microcline and quartz are present in the flotation feed.

The mineral composition for each product (feldspar concentrate and tailings) was calculated as follows:

$$\% \text{ Albite} = \frac{\% \text{ Na2O}}{9.3414} \times 100.0$$

$$\% \text{ Microcline} = \frac{\% \text{ K2O}}{15.015} \times 100.0$$

$$\% \text{ Quartz} = 100 - (\% \text{ Albite} + \% \text{ Microcline})$$

Finally, minerals recovery for each product (feldspar concentrate, tailings or flotation feed) was calculated as follows:

$$\text{Albite recovery} = \frac{\% \text{ Weight} \times \% \text{ Albite}}{\% \text{ Albite in the feed}} \times 100.0$$

LOI (loss on ignition) was determined by measuring the sample weight before and after firing at 1050° C. for 1 hour. The % loss corresponded to LOI.

The reagents consumption, when stated in gram per ton, was calculated as follows:

$$\frac{\text{Amount of pure reagent added during the test (g)} \times 1000}{\text{Mass of the flotation feed (kg)}}$$

After grinding, the % wt. of each fraction into which a granular sample is dry-classified, with respect to particle size (microns), was measured to know the particle size distribution of the feed.

The following reagents were used in the examples:
Component (a): Cataflot® CSO, manufactured by Ceca, Arkema Group.
Since it is mixture of N-alkylamines, insoluble in water, Cataflot® CSO was dissolved as follows:
  Cataflot® CSO (which is solid at room temperature) was heated to about 50° C.;
  25.15% wt. acetic acid, 8.19% wt. Cataflot® CSO and 66.66% wt. de-ionized water were then mixed together; the obtained solution was stirred for many hours.
Component (b):
  Isofol® 12, commercialized by Sasol Olefins & Surfactants GmbH, comprising 2-butyloctanol;
  Isofol® 16, commercialized by Sasol Olefins & Surfactants GmbH, comprising 2-hexyldecanol; and
  Isotridecan-1-01, a primary aliphatic isoalcohol.
These alcohols were used in pure, undiluted form.

Examples 1-4

A feldspar ore from a metamorphic leptynite-type deposit, having the composition reported in Table 1 (dry form), was used in these examples:

TABLE 1

| | $Na_2O$ | $K_2O$ | CaO | MgO | $Fe_2O_3$ | MnO | $Al_2O_3$ | $SiO_2$ | $TiO_2$ | $P_2O_5$ | LOI |
|---|---|---|---|---|---|---|---|---|---|---|---|
| % wt. | 3.5 | 4.13 | 1.22 | 0.08 | 0.95 | 0.11 | 14.81 | 74.73 | 0.009 | 0.11 | 0.51 |

| | Albite | Microcline | Garnet | Quartz |
|---|---|---|---|---|
| % wt. | 37.27 | 28.13 | 2.87 | 31.72 |

The ore was crushed to −2 mm and the garnet particles were removed by dry magnetic processing, using a high-intensity permanent magnet PermRoll®, having a cylinder diameter of 70 mm.

1 kg of the obtained material was then ground in a stainless steel rod mill, with 6.65 kg charge and 530 mL water (pulp density of about 66%) for 9.5 minutes. The size of the material was reduced to 90% passing 400 μm. After grinding, the material was finally deslimed with water by screening with a 50 μm screen, thus obtaining the feldspar containing feed material having the composition reported in Table 2.

TABLE 2

| | $Na_2O$ | $K_2O$ | CaO | MgO | $Fe_2O_3$ | $Al_2O_3$ | $SiO_2$ | $TiO_2$ | LOI |
|---|---|---|---|---|---|---|---|---|---|
| % wt. | 3.42 | 4.29 | 1.31 | 0.01 | 0.04 | 14.26 | 76.32 | 0.02 | 0.33 |

| | Albite | Microcline | Garnet | Quartz |
|---|---|---|---|---|
| % wt. | 36.46 | 29.24 | 0.12 | 34.17 |

1 kg of the feldspar containing feed material obtained as described above was transferred to an hexagonal conditioning tank, using a 3-bladed, 6.35 cm (2.5 inches)-wide impeller at 1000 rpm. The pulp density was adjusted to 70% wt. feldspar containing feed solids with tap-water. The obtained pulp was adjusted with $H_2SO_4$ (6N solution) to the pH values reported in Table 3, and the obtained suspension was stirred at room temperature for at least 1 minute (conditioning step).

Thereafter, amine (a) indicated in Table 3 was added and the obtained suspension was stirred at room temperature for 3 minutes.

One minute thereafter (i.e. one minute after addition of component (a)), component (b) indicated in Table 3 was added and the obtained suspension was stirred at room temperature for at least 2 minutes. The ratio of component (a)/component (b) was about 1.4.

The reagents consumptions (g reagent/ton feldspar containing feed material) are reported in Table 3.

The obtained suspension was transferred to a flotation cell and flotation was carried out in a WEMCO laboratory cell, having a cell volume of 3 L, at 1200 rpm. The pulp density was adjusted to 25-30% with tap-water. The flotation pH was not adjusted, but the pH value was measured at the beginning of the flotation step. Flotation was carried out for 5 minutes.

The results thus obtained are shown in Table 4 and FIG. 1.

Comparative Example 1

The procedure of Examples 1-3 was repeated, with the difference that 390 g HF/ton feldspar containing feed material were used in place of H2SO4 with Cataflot® CSO only (no co-collector was used), in the amounts indicated in Table 4. The flotation results are shown in Table 4 and FIG. 1.

Comparative Example 2

The procedure of Examples 1-3 was repeated, but using only component (a) and no component (b), as indicated in Table 3, in the amounts reported therein. The flotation results are shown in Table 4 and FIG. 1.

Example 4

The procedure of Examples 1-3 was repeated using a linear alcohol (dodecanol) as component (b) in place of the isoalcohols tested in Examples 1, 2 and 3.

TABLE 4

|  | Feldspar recovery (% wt.) | Quartz recovery (% wt.) |
|---|---|---|
| Example 1 | 55.6 | 5.1 |
| Example 2 | 68.6 | 8.5 |
| Example 3 | 71.5 | 7.6 |
| Comp. Ex. 1 | 92.3 | 15.7 |
| Comp. Ex. 2 | 18.9 | 4.3 |
| Example 4 | 71.5 | 28.6 |

The data reported in Table 4 and FIG. 1 show that the flotation reagents of Examples 1-3 give results approaching the one of the HF reagent system of Comparative Example 1, under the same conditions of reagents consumption and pH values. The flotation reagents of Examples 2 and 3 give very high values of feldspar recovery. Comparative Example 2 gave unsatisfactory level of feldspar recovery; this is an evidence of the benefits of the synergistic effect of the collectors used in the invention, with different molecular structures.

Examples 5-8

Further tests were carried out to evaluate the influence of the pH during the conditioning stage. The procedure of Example 3 was repeated, by using 415 g/t of Cataflot® CSO as component (a) and 270 g/t of isotridecan-1-ol as component (b).

Before the addition of components (a) and (b), a conditioning step was carried out by adjusting with $H_2SO_4$ (6N solution) the pH to the values reported in Table 5; the obtained suspension was stirred at room temperature for at least 1 minute.

The flotation results are shown in Table 5 and FIGS. 2 and 3. As evident from such results, for low pH values up to about pH of 1.80, the conditioning pH had almost no influence on the selectivity towards feldspar; as a result, the quartz recoveries were almost constant and the quartz contents in the feldspar concentrates were very low. Nevertheless, the data indicates that feldspar recovery may be sensitive to the conditioning pH value: the lower the pH value, the weaker the feldspar recovery. Feldspar recoveries had a remarkable increase up to pH values of 1.77, but beyond pH values of 1.80, the selectivity towards feldspars began to

TABLE 3

|  | Acid (g/t feldspar containing feed) | Comp. (a) | Comp. (b) | Amount (a) g/t feldspar containing feed | Amount (b) g/t feldspar containing feed | pH in conditioning step |
|---|---|---|---|---|---|---|
| Example 1 | $H_2SO_4$ (780) | Cataflot ® CSO | Isofol ® 12 | 430 | 290 | 1.6 |
| Example 2 | $H_2SO_4$ (770) | Cataflot ® CSO | Isofol ® 16 | 425 | 305 | 1.8 |
| Example 3 | $H_2SO_4$ (800) | Cataflot ® CSO | Isotridecan-1-ol | 430 | 320 | 1.8 |
| Comp. Ex. 1 | HF (390) | Cataflot ® CSO | — | 545 | — | Not measured* |
| Comp. Ex. 2 | $H_2SO_4$ (775) | Cataflot ® CSO | — | 425 | — | 1.8 |
| Example 4 | $H_2SO_4$ (420) | Cataflot ® CSO | Dodecanol | 530 | 125 | 1.8 |

*pH not measured for HF as it is too corrosive.

decrease, with a consequent increase of quartz content in the feldspar concentrate. For these tests; feldspar selectivity was very low at pH 2.4.

TABLE 5

|  | Conditioning pH | Feldspar recovery (% wt.) | Quartz recovery (% wt.) |
|---|---|---|---|
| Example 5 | 1.4 | 35.2 | 7.8 |
| Example 6 | 1.7 | 68.9 | 11.9 |
| Example 7 | 1.9 | 82.6 | 33.6 |
| Example 8 | 2.4 | 85.5 | 88.0 |

Examples 9-10

Further tests were carried out to evaluate the influence of sulphuric acid consumption during the conditioning step of the process of the invention. The procedure of Example 3 was repeated, but different amounts of reagent were added, as indicated in Table 6. The flotation results are shown in Table 7 and FIG. 4.

TABLE 6

|  | Amount (a) g/t feldspar containing feed | Amount (b) g/t feldspar containing feed | Amount 6N $H_2SO_4$ (mL) g/t feldspar containing feed | pH |
|---|---|---|---|---|
| Example 9 | 410 | 270 | (1.1) 425 | 1.9 |
| Example 10 | 410 | 370 | (1.3) 530 | 1.9 |

TABLE 7

|  | Feldspar recovery (% wt.) | Quartz recovery (% wt.) |
|---|---|---|
| Example 9 | 82.6 | 33.6 |
| Example 10 | 82.7 | 21.6 |

Normally, the higher the reagents consumption, the higher the recoveries of both feldspar and quartz; therefore, at a same consumption in amine (a), an increase of component (b) dosage is expected to reduce the selectivity towards feldspar. Unexpectedly, the above results show that the feldspar recovery remained fairly constant, whereas the quartz particles flotation greatly decreased (more than 10%). Therefore, even at the same pH value, an increased acid consumption led to enhanced selectivity. These results have also very important implications in industrial application of the process of the invention; in fact, in normal plant operations, maintaining the conditioning pH in a narrow range is commonly a complex task. These experiments demonstrate that feldspar flotation results are not affected, provided that sulfuric acid consumption is maintained constant.

Examples 11-12

Further tests were carried out to evaluate the influence of the pH during the to flotation step (2) of the process of the invention. The procedure of Example 3 was repeated, but the suspension transferred to the flotation cell was diluted with tap-water to a pulp density of 25-30% wt., and the flotation pH was adjusted to the values indicated in Table 8.

The flotation results are shown in Table 8 and FIG. 5.

TABLE 8

|  | Flotation pH | Feldspar recovery (% wt.) | Quartz recovery (% wt.) |
|---|---|---|---|
| Example 11 | 2.99 | 68.7 | 8.6 |
| Example 12 | 1.82 | 53.4 | 5.5 |

The above results demonstrate that, if the pH of the flotation aqueous suspension is decreased, selectivity towards feldspars is hardly enhanced, but feldspar recovery may be negatively affected.

Examples 13-14

Further tests were carried out on another feldspar ore (Spruce Pine ore, U.S.). The procedure of examples 1-3 was repeated: during the conditioning step, the pulp density was adjusted to 70% wt. feldspar feed solids with tap-water. The obtained pulp was adjusted to pH 1.7 with $H_2SO_4$ (6N solution) and the obtained suspension was stirred at room temperature for at least 1 minute (conditioning step).

Thereafter, amine (a) in the amount indicated in Table 9 was added and the obtained suspension was stirred at room temperature, for 3 minutes.

One minute thereafter, component (b) in the amount indicated in Table 9 was added and the obtained suspension was stirred at room temperature for 2 minutes. The ratio of component (a)/component (b) was about 2.

The reagents consumption was for $H_2SO_4$ of 465 g/ton feldspar containing feed material, for component (a) of 460 g/t feldspar feed material, and for component (b) of 230 g/t feldspar feed material.

The obtained suspension was finally transferred to the flotation cell. The pulp density was adjusted to 25-30% with tap-water. The flotation pH was not adjusted, but the pH value was measured at the beginning of the flotation step. Flotation was carried out for 5 minutes.

The results thus obtained are shown in Table 10 and FIG. 6.

TABLE 9

|  | Acid g/t feldspar feed | Comp. (a) | Comp. (b) | Amount (a) g/t feldspar feed | Amount (b) g/t feldspar feed | pH in conditioning step |
|---|---|---|---|---|---|---|
| Example 13 | $H_2SO_4$ (460) | Cataflot ® CSO | Isotridecan-1-ol | 460 | 230 | 1.70 |
| Example 14 | $H_2SO_4$ (470) | Cataflot ® CSO | Isofol ® 16 | 465 | 230 | 1.70 |

TABLE 10

|  | Feldspar recovery (% wt.) | Quartz recovery (% wt.) |
|---|---|---|
| Example 13 | 88.4 | 10.3 |
| Example 14 | 82.0 | 3.9 |

The above results show that the flotation reagent system used in the process of the invention is efficient whatever the ore treated.

Although only preferred embodiments of the invention are specifically disclosed and exemplified above, it will be appreciated that many modifications and variations of the present invention are possible in the light of this teaching, within the scope of the invention as defined by the appended claims.

Example 15

A pilot-scale experiment was carried out in order to confirm the lab scale results in a continuous process (ab. 160 kg feed material/h). Water was recirculated during the experiment. The feldspar feed material used was a pegmatite from North Carolina (U.S.) and having the composition reported in Table 11 below.

Operating conditions applied during testing are shown in Table 12. Results (expressed as Oxides content and distribution of the floated material and the flotation tailings) are shown in Table 13 below.

TABLE 12

| $H_2SO_4$ (g/t) | pH | % Solid | Amine (g/t) | Alcohol (g/t) | Am:Alc Weight ratio |
|---|---|---|---|---|---|
| 1130 | 1.7-1.85 | 57% | Cataflot ® CSO (725) | Isofol 16 (705) | 1.03 |

By considering that all of the $Na_2O$ and $Al_2O_3$ are derived from the feldspar minerals, feldspar recovery is approximately 84% and the selectivity towards feldspars is excellent, noting that the alkali content within the concentrate of bench 1 is 12.4% and the alumina content is greater than 19%.

Thus, it can be seen that the present invention works in a continuous scheme without being affected by the recirculation of water during the process.

TABLE 11

|  | Weight, % | $SiO_2$ | $Al_2O_3$ | $Fe_2O_3$ | $TiO_2$ | CaO | MgO | $Na_2O$ | $K_2O$ | LOI (1050° C.) | Total |
|---|---|---|---|---|---|---|---|---|---|---|---|
| 315-400 μm | 27.90% | 75.6 | 13.1 | 0.15 | 0.02 | 1.23 | 0.01 | 5.20 | 3.87 | 0.36 | 99.54 |
| 250-315 μm | 29.00% | 76.1 | 13.1 | 0.12 | 0.02 | 1.22 | 0.01 | 5.20 | 3.63 | 0.30 | 99.70 |
| 160-250 μm | 26.30% | 76.2 | 13.0 | 0.08 | 0.02 | 1.18 | 0.01 | 5.03 | 3.42 | 0.30 | 99.24 |
| 50-160 μm | 16.50% | 75.4 | 13.6 | 0.08 | 0.02 | 1.24 | 0.01 | 5.39 | 3.62 | 0.36 | 99.72 |
| <50 μm | 0.26% | 71.6 | 16.0 | 0.26 | 0.02 | 1.29 | 0.01 | 4.89 | 4.53 | 0.39 | 98.99 |
|  | 99.96% | 75.83 | 13.16 | 0.11 | 0.02 | 1.22 | 0.01 | 5.18 | 3.64 | 0.33 | 99.50 |

TABLE 13

|  | Weight % | Content, % | | | Yield | | |
|---|---|---|---|---|---|---|---|
|  | % | $Al_2O_3$ | $Na_2O$ | $K_2O$ | $Al_2O_3$ | $Na_2O$ | $K_2O$ |
| Bench 1 | 51.70% | 19.16 | 7.68 | 4.74 | 68.7% | 69.2% | 65.9% |
| Bench 2 | 12.40% | 17.51 | 6.67 | 4.56 | 15.1% | 14.4% | 15.2% |
| Feldspar | 64.10% | 18.84 | 7.48 | 4.71 | 83.8% | 83.6% | 81.1% |
| Tailings | 35.90% | 6.51 | 2.62 | 1.96 | 16.2% | 16.4% | 18.9% |
| Flotation Feeding | 100.00% | 14.41 | 5.74 | 3.72 | 100.0% | 100.0% | 100.0% |

The invention claimed is:

1. A flotation process for recovering feldspar, the process comprising:
   (i) forming an aqueous suspension of a feed material comprising feldspar, in the absence of hydrofluoric acid, wherein the suspension has a pH ranging from 1.3 to 3.0, and wherein the suspension comprises from 0.004% wt. to 0.3% wt. of a flotation reagent comprising:
      (a) one or more cationic amines, containing at least one aliphatic hydrocarbon chain, linear or branched, saturated or unsaturated, comprising 8 to 50 carbon atoms, or a salt thereof; and
      (b) at least one alcohol chosen from $C_{12}$-$C_{32}$ 2-alkyl-1-alkanols, $C_{10}$-$C_{25}$ iso-alcohols, and mixtures thereof;
   wherein the ratio of (a) to (b) ranges from 500:1 to 1:40 by weight;
   (ii) agitating the suspension to produce a feldspar containing fraction; and
   (iii) separating the feldspar containing fraction.

2. The flotation process according to claim 1, wherein the ratio of (a) to (b) ranges from 200:1 to 1:20 by weight.

3. The flotation process according to claim 1, wherein the ratio of (a) to (b) ranges from 35:1 to 1:5 by weight.

4. The flotation process according to claim 1, wherein in step (i), the pH of the aqueous suspension ranges from 1.6 to 1.9.

5. The flotation process according to claim 1, wherein step (i) includes adding sulfuric acid or hydrochloric acid to the suspension.

6. The flotation process according to claim 1, wherein step (i) includes adding from 0.1 kg to 1.5 kg of acid per ton of feed material.

7. The flotation process according to claim 1, wherein the feed material has a solids concentration ranging from 20% wt. to 75% wt.

8. The flotation process according to claim 1, wherein component (a) is an amine of formula (I):

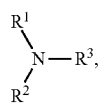

(I)

wherein $R^1$ is an alkyl group, linear or branched, saturated or unsaturated, containing 8 to 50 carbon atoms, and $R^2$ and $R^3$ are independently selected from H and an alkyl group, the alkyl group being linear or branched, saturated or unsaturated, and containing 1 to 5 carbon atoms.

9. The flotation process according to claim 8, wherein $R^1$ contains 10 to 30 carbon atoms.

10. The flotation process according to claim 9, wherein each of $R^2$ and $R^3$ contains 1 to 3 carbon atoms.

11. The flotation process according to claim 8, wherein $R^1$ contains 12 to 25 carbon atoms.

12. The flotation process according to claim 11, wherein each of $R^2$ and $R^3$ contains 1 to 3 carbon atoms.

13. The flotation process according to claim 8, wherein each of $R^2$ and $R^3$ contains 1 to 3 carbon atoms.

14. The flotation process according to claim 1, wherein in step (i), the amount of component (a) in the aqueous suspension ranges from 0.003% wt. to 0.15% wt., and from 0.05 kg to 2 kg of acid is added per ton of feed material.

15. The flotation process according to claim 1, wherein the amount of component (b) in the aqueous suspension ranges from 0.0005% wt. to 0.15% wt., and the consumption of component (b) ranges from 0.01 kg/ton to 2 kg/ton of feed material.

16. The flotation process according to claim 1, wherein the feed material has an average particle size ranging from 1 micron to 800 microns.

17. The flotation process according to claim 1, wherein the feed material has an average particle size ranging from 50 microns to 400 microns.

18. The flotation process according to claim 1, wherein in the concentration of the feldspar containing feed material ranges from 5% wt. to 50% wt. during process step (ii).

19. The flotation process according to claim 1, wherein the concentration of the feldspar containing feed material ranges from 25% wt. to 30% wt. during process step (ii).

20. The flotation process according to claim 1, wherein the pH of the suspension ranges from 1.6 to 5.5 during process step (ii).

21. The flotation process according to claim 1, wherein the pH of the suspension ranges from 2.5 to 4.0 during process step (ii).

22. The flotation process according to claim 1, wherein the feed material is obtained from a feldspar ore.

23. A flotation process for recovering feldspar, the process comprising:
    combining at least one N-alkyl cationic amine with an aqueous suspension of a feed material comprising feldspar, in the absence of hydrofluoric acid, to form a first mixture, wherein the mixture has a pH ranging from 1.3 to 3.0;
    adding to the first mixture at least one non-ionic branched primary alcohol comprising 10 to 50 carbon atoms to form a second mixture, wherein the weight ratio of the at least one N-alkyl cationic amine to the at least one non-ionic branched primary alcohol ranges from 500:1 to 1:40;
    agitating the second mixture to produce a fraction comprising feldspar; and
    separating the fraction from a remainder of the second mixture, wherein the at least one non-ionic branched primary alcohol comprises a $C_{12}$-$C_{32}$ 2-alkyl-1-alkanol, a $C_{10}$-$C_{25}$ iso-alcohol, or a mixture thereof.

* * * * *